United States Patent
Han et al.

(10) Patent No.: US 7,303,253 B2
(45) Date of Patent: Dec. 4, 2007

(54) MULTI-PASS PRINT APPARATUS AND METHOD

(75) Inventors: Hsiao-Yu Han, Hsinchu (TW); Yao-Wen Huang, Hsinchu (TW); Meng-Fen Le, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 77 days.

(21) Appl. No.: 11/406,265

(22) Filed: Apr. 19, 2006

(65) Prior Publication Data
US 2007/0153042 A1    Jul. 5, 2007

(30) Foreign Application Priority Data
Dec. 30, 2005   (TW)   .............................. 94147539 A

(51) Int. Cl.
*B41J 2/15* (2006.01)

(52) U.S. Cl. .......................................... 347/41; 347/15

(58) Field of Classification Search .................. 347/15, 347/41, 12; 358/1.2, 1.9, 3.23, 524
See application file for complete search history.

(56) References Cited

U.S. PATENT DOCUMENTS

| 4,748,453 | A |   | 5/1988  | Lin et al. |
| 4,999,646 | A |   | 3/1991  | Trask |
| 5,633,663 | A |   | 5/1997  | Matsubara et al. |
| 6,309,041 | B1 | * | 10/2001 | Richtsmeier et al. ......... 347/12 |
| 6,328,400 | B1 | * | 12/2001 | Yonekubo et al. ............ 347/15 |

\* cited by examiner

*Primary Examiner*—Lamson Nguyen
(74) *Attorney, Agent, or Firm*—Rabin & Berdo, P.C.

(57) ABSTRACT

A multi-pass printing apparatus and a method thereof are provided. The print data is divided into multiple passes of print data. Each of the print passes is printed according to different delay position signals, such that a complete print output is achieved. Each pass of the print data to be printed corresponds to multiple pixels, and the pixels corresponding to each pass of print data to be printed are obtained by a complementary mask method, or by classifying the pixels with a same remainder got by dividing the horizontal positions of the print data with the number of the M passes into a same group.

8 Claims, 7 Drawing Sheets

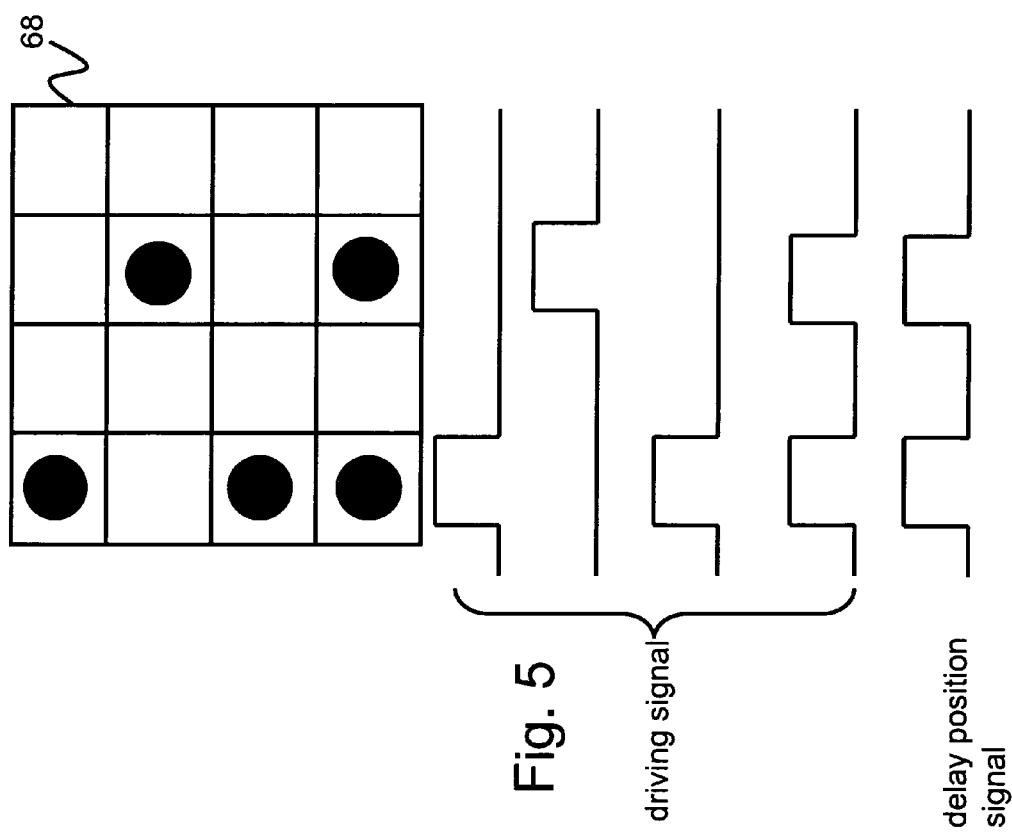

driving signal delay position signal

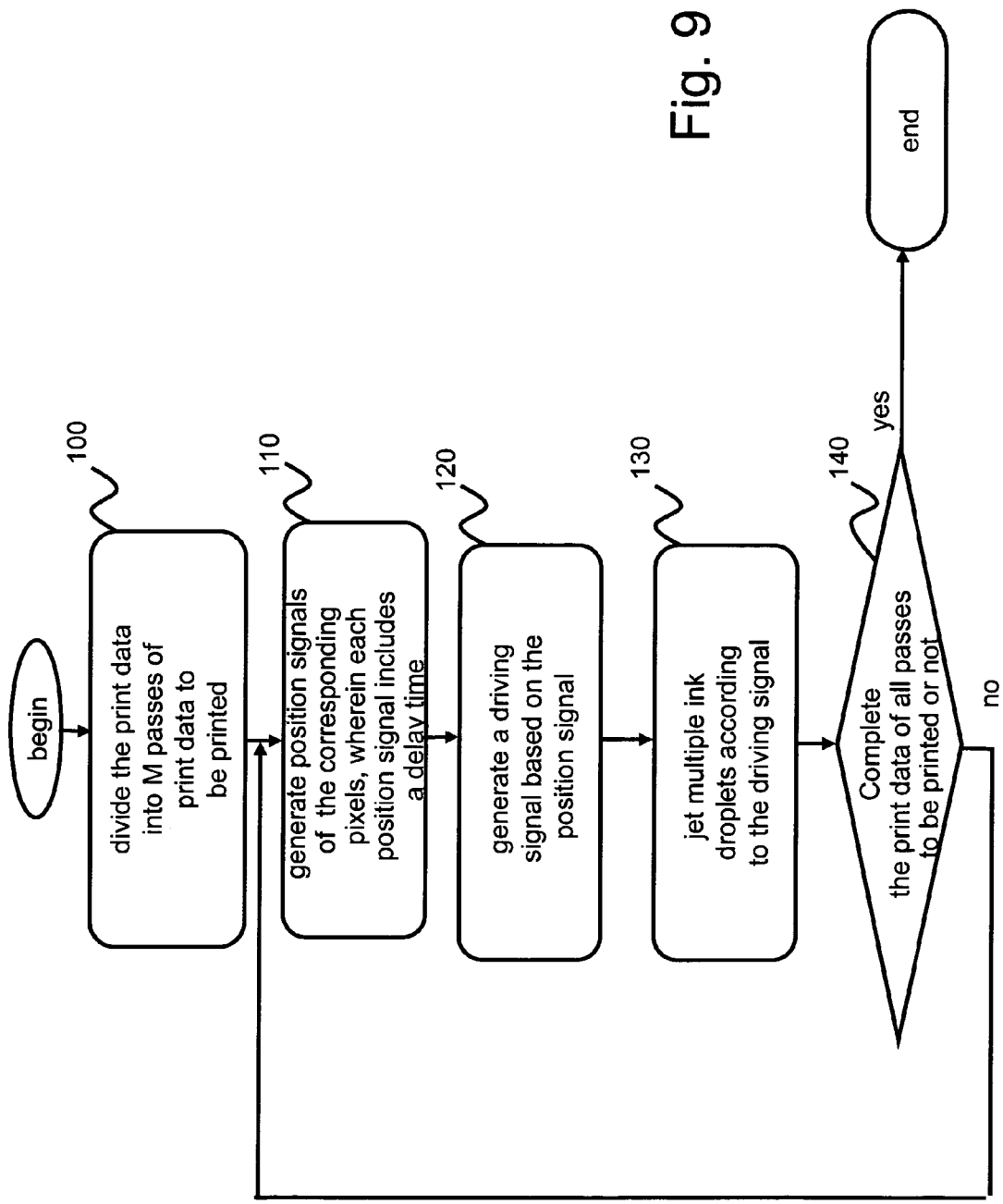

MULTI-PASS PRINT APPARATUS AND METHOD

BACKGROUND OF THE INVENTION

1. Field of Invention

The present invention relates to a printing apparatus and a method thereof, and more particularly, to a multi-pass printing apparatus and a method thereof. The print data is divided into multiple passes of print data, and each pass of the print data is printed according to different delay position signals, such that a complete print output is achieved.

2. Related Art

A digital image stored in a computer usually comprises a mix of three primary colors: red (R), green (G), and blue (B) in different proportions. Taking a 24-bit image as an example, each of R, G, and B comprise 8 bits respectively. The color level of each primary color is 0~255, and a color of black is displayed when the R, G, and B values are all 0, while a color of white is displayed when the R, G, and B values are all 255.

However, when a digital image in the computer is to be output, a problem occurs because many print and display devices cannot generate various color levels. Therefore, when a digital image is to be printed, the color must be converted to a color space of the output device at first. Taking a printer as an example, it is usually converted to C (cyan), M (Magenta), and Y (Yellow).

Then, the color level of the image is processed, such that an original multi-color level image is changed to a low-color level image. This step is referred to as halftoning. Each pixel of the halftone image is expressed by different degrees, and different degrees correspond to different numbers of ink droplets. Finally, the halftone image is converted to a print data to be output according to the arrangement of the ink holes of the ink-jet head, and finally a print image is produced.

Nowadays, with the progress of print systems and ink-jet heads, print resolution has been enhanced to more than 4800 DPI (Dots/Inch) from 300 DPI ten years ago. Generally speaking, a horizontal print resolution is mainly limited by motor control and the ink-jet head. In the print, the ink-jet head is controlled by the motor to move back and forth in a horizontal direction, and the motor sends a position signal at each position. The position signal is used to inform the ink-jet head when it is time to jet ink. At that time, the ink-jet driving mechanism sends a driving signal to the ink-jet head according to the print data, and then the ink-jet head jets ink droplets at the position.

Therefore, if the motor cannot meet the print resolution requirement, the ink droplets printed on the paper will deviate significantly, causing a degradation of the output quality. On the other hand, there is a limitation to the driving frequency of the ink-jet head, that is, the interval between two drives of a same ink-jet hole must be larger than a certain time interval. Otherwise, the ink-jet hole cannot be driven.

Furthermore, the size of the ink droplet is also an important factor limiting the print resolution. If a single ink-droplet exceeds the size of a print position, ink droplets will overlap, causing ink overflow, negatively affecting print quality when printing with a high resolution is carried out.

To solve the above disadvantages, U.S. Pat. No. 4,748,453 provides a print method with a checkerboard pattern, wherein the print data is divided into at least two passes to be printed. Through this print manner, adjacent dots in the horizontal and vertical directions are not be printed in a same pass, such that the ink droplets are prevented from staining each other and thus ink overflow or color shift is avoided.

A print method of a checkerboard pattern is also employed in U.S. Pat. No. 4,999,646. The difference lies in that the print passes are not completely overlapped, but partially overlapped. That is, a paper must be fed after a print pass has been finished, and then proceed to a next print pass, such that ink overlap or color shift can be avoided, and also the quality problem caused by incorrectness of the paper feed motor and breakdown of the ink-jet hole can be further reduced.

Furthermore, U.S. Pat. No. 5,633,663 provides another print method and device. A thinning mask is used to divide the original print data into two passes. Taking a relationship between different inks into consideration, the designed mask does not allow inks to be printed at a same pixel under a same pass. Therefore, ink overflow among different inks is improved.

The conventional techniques are all directed to avoid mutual staining of ink and color shift. Under high resolution printing, a specially-designed mask or pattern is used to divide the print data into different passes to be printed. A mask of a checkerboard pattern can be used to avoid the limitation of the driving frequency of the ink-jet head, but the horizontal print resolution is still the same as the data resolution, and horizontal control of the motor is still limited by the data resolution.

SUMMARY OF THE INVENTION

A main object of the present invention is to provide a multi-pass printing apparatus and a method thereof. The print data is divided into multiple passes of print data, and each pass is printed according to different delay position signals, such that a complete print output is achieved.

The multi-pass printing apparatus provided by the present invention performs printing according to a matrix image data. The multi-pass printing apparatus comprises a pass-dividing unit, a position-signal generating unit, a head-driving unit, and an ink-jet head.

The pass-dividing unit is used to divide the print data into M passes of print data to be printed, and each pass of the print data to be print includes multiple corresponding pixels.

The corresponding pixels in each pass of the print data to be printed can be obtained by a complementary mask method, or by classifying the pixels with a same remainder got by dividing the horizontal position of the print data with the number of the M passes to be printed into a same group, until the remainder reaches (M−1).

The position-signal generating unit sends a position signal with a resolution of N (the print data resolution is N DPI) divided by M (M passes to be printed) DPI, corresponding to each pass of the print data to be printed. Each position signal also includes positions of the corresponding pixels in each pass of print data to be printed.

The position signal of each pass of print data to be printed is derived by delaying a period of time based on the original position signal. Therefore, there are M kinds of delay position signals corresponding to the M passes to be printed.

The head-driving unit generates a corresponding driving signal at the position of each corresponding pixel by responding to each position signal and cooperating with each corresponding pass of print data to be printed.

Then, the ink-jet head jets multiple ink droplets for printing, responding to the driving signal generated by the head-driving unit.

Furthermore, the present invention also provides a multi-pass print method, which is also a method for printing the print data based on a matrix image data. The print data is divided into M passes of print data to be printed, wherein each pass of print data to be printed includes multiple corresponding pixels.

Then, a plurality of position signals corresponding to each pass of print data to be printed is generated. Each position signal has positions of the corresponding pixels in each pass of print date to be printed, wherein the position signal corresponding to each pass to be printed delays for a time based on the original position signal, thereby scheduling the M passes to be printed.

Then, the head-driving unit is provided to generate a corresponding driving signal at the positions of the corresponding pixels by responding to the position signal and cooperating with each pass of the print data to be printed. Then, an ink-jet head is provided for jetting multiple ink droplets, responding to the driving signal generated by the head-driving unit.

The print data of all passes to be printed are confirmed to have been completed. If it is not the case that each pass of the print data to be printed has been completed, it proceeds to one of the multiple passes to be printed, until each pass of print data to be printed is completed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein:

FIG. 5 is a completion view of the first pass of the print data;

FIG. 6 is a view of pixels to be printed in the second pass of print data;

FIG. 9 is a flow chart of the multi-pass print method according to the present invention.

DETAILED DESCRIPTION OF THE INVENTION

In a multi-pass printing apparatus and method thereof provided by the present invention, the print data is divided into multiple passes of print data to be printed, and each pass of print data to be printed is printed according to different delay position signals, such that a complete print output is achieved.

Each pass of the print data to be printed corresponds to multiple pixels, and the pixels corresponding to each pass of print data to be printed are obtained by a complementary mask method, or by classifying the pixels with a same remainder got by dividing the horizontal positions of the print data with the number of the M passes into a same group.

That is, the pixels with remainders 0 got by dividing the horizontal position of the print data by the number of the M passes to be printed are classified into a same group, the ones with remainders 1 are classified into a same group, and the ones with remainders 2 are classified into a same group. The others can be deduced in such a way, until the ones with remainders (M−1) got by dividing the horizontal position of the print data with the number of the M passes to be printed are classified into a same group.

Figure 1:
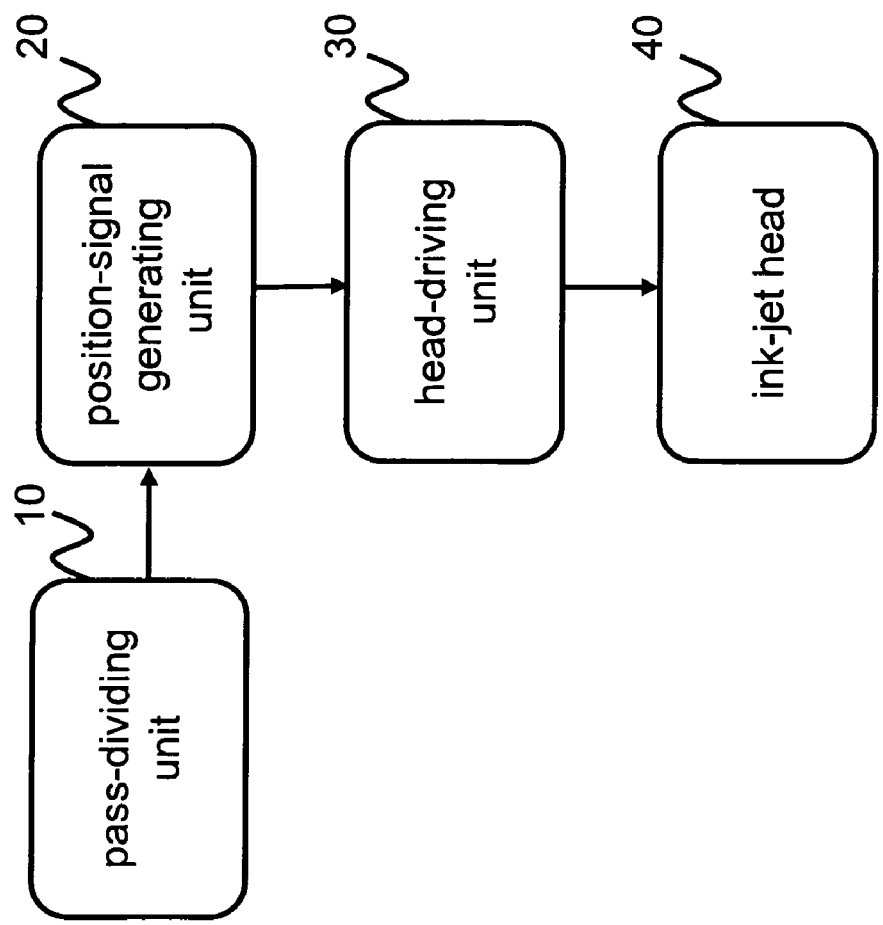
FIG. 1 is a block diagram of a multi-pass printing apparatus according to the present invention.

Referring to FIG. 1, it is a block diagram of a multi-pass printing apparatus according to the present invention, which includes a pass-dividing unit 10, a position-signal generating unit 20, a head-driving unit 30, and an ink-jet head 40. The flow of a multi-pass print method will be illustrated in FIG. 9.

Figure 2:
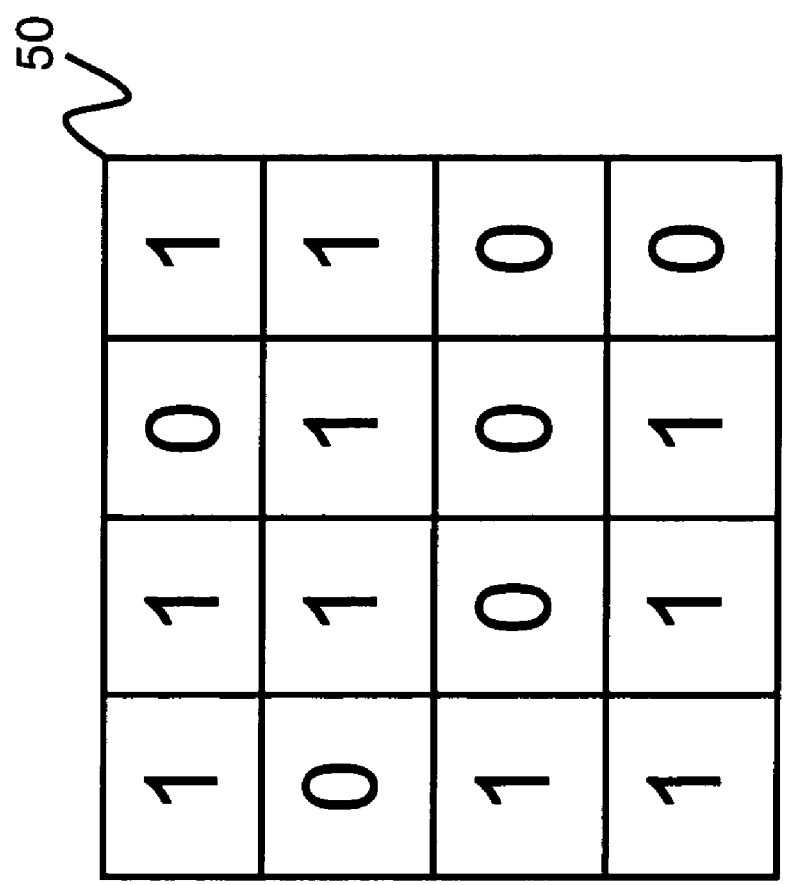
FIG. 2 is a matrix image data to be printed.

Referring to FIG. 2, an action manner of a multi-pass printing apparatus provided by the present invention is illustrated with FIG. 1. The printed pixels of each pass of the print data to be printed are generated by a complementary checkerboard mask method.

In FIG. 2, it is a matrix image data with a resolution of 600 DPI, i.e., a print data 50 to be printed. In the print data 50, the pixels to be printed are represented by "1", i.e., jetting ink droplets, and the pixels not to be printed are represented by "0", i.e., not jetting ink droplets.

Figure 3B:
FIGS. 3A and 3B are views of complementary masks of two print passes.
Figure 3A:

At first, the pass-dividing unit 10 divides the print data 50 into two print passes of print data according to the horizontal position of the print data 50. At that time, two complementary masks 55, 60 are generated to determine the positions of the pixels to be printed of the first print pass and the second print pass, such that the first print pass of the print data of and the second print pass of the print data are generated, as shown in FIGS. 3A and 3B.

After two print passes of the print data are generated by the pass-dividing unit 10, the position-signal generating unit 20 gives a delay time corresponding to each pass of print data to be printed according to the resolution of the print data 50 and the divided print passes of the print data, such that position signals with different delay times are generated, corresponding to different print passes.

The setting of the delay time is illustrated with the resolution of the print data 50 and the divided passes to be printed.

When the resolution of the print data 50 is N DPI, and the print data 50 is divided into M passes of print data to be printed by the pass-dividing unit 10, the position-signal generating unit 20 sends a position signal with a resolution of N/M DPI, corresponding to each pass of print data to be printed. Each position signal includes the positions of the pixels corresponding to each pass of print data to be printed. The position signal of each pass of the print data to be printed is derived by delaying for a period of time based on the original position signal. Therefore, there are M kinds of delay position signals corresponding to the M passes to be printed.

In the embodiment of FIG. 2, the position-signal generating unit 20 generates two position signals by two delay times. Therefore, when the first print pass of print data is printed according to a zero-delay position signal, the second pass of print data to be printed is printed according to a position signal for delaying 1/600 inch. The print resolutions of two print passes are 300 DPI. When the two print passes are executed, the executing sequences can be exchanged one another.

Figure 4:
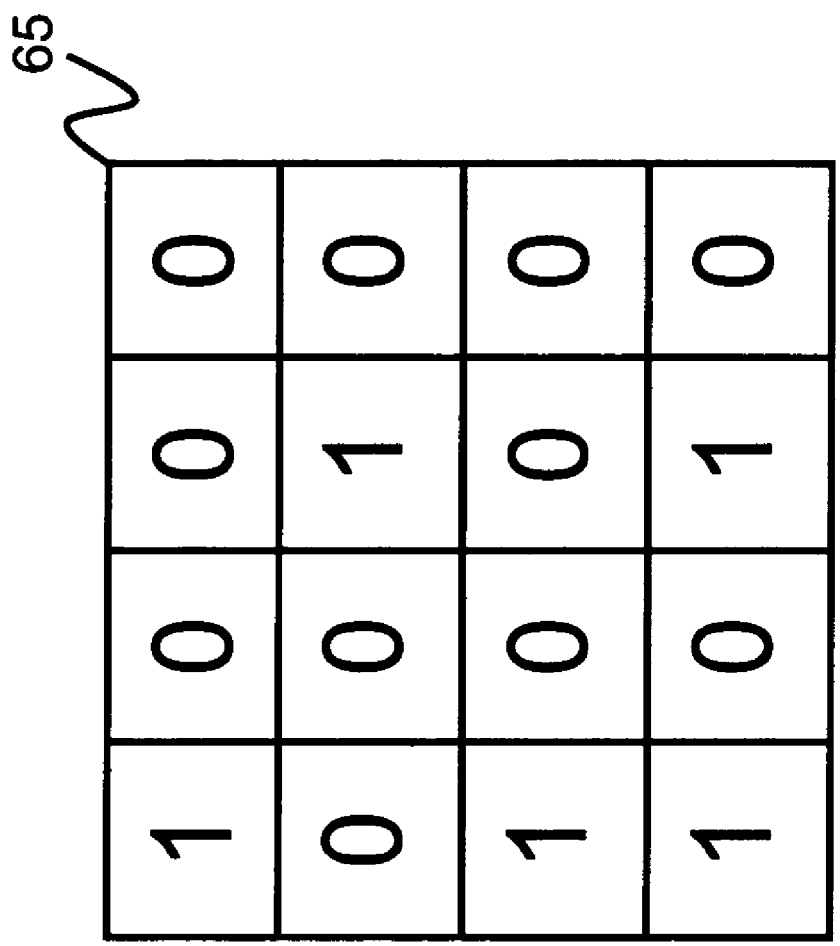
FIG. 4 is a view of pixels to be printed in the first pass of print data.

Therefore, when the first print pass is executed, the pass-dividing unit 10 performs a logic operation to the original print data 50 (referring to FIG. 2) and the mask 55 (referring to FIG. 3A) used in the first print pass in an AND Logic manner, such that the first print pass of the print data is generated, i.e., the multiple pixel data 65 to be printed in the first print pass, as shown in FIG. 4.

In the print process of the first print pass, the position-signal generating unit 20 generates a position signal of the first print pass of print data, and the head-driving unit 30 generates a corresponding driving signal in a position 68 corresponding to each pixel in the first print pass of print data by responding to the position signal and cooperating with the first pass of print data, such that the ink-jet head 40 prints the data, as shown in FIG. 5.

In another word, the head-driving unit 30 generates multiple driving signals according to the position signals corresponding to the pixel data "1" in the first print pass of print data, such that ink-jet head 40 jets ink droplets at all places with pixels "1" in the first pass according to the driving signals.

After the first print pass of the print data is printed, i.e. when the second print pass begins to be executed, the pass-dividing unit 10 performs a logic operation to the original print data 50 (referring to FIG. 2) and the mask 60 (referring to FIG. 8) used in the print of the second pass in an AND Logic manner, such that the second print pass of print data is generated, i.e. multiple pixel data 70 to be printed in the second print pass, i.e., the pixel "1" to be printed in the second pass, as shown in FIG. 6.

Figure 7:
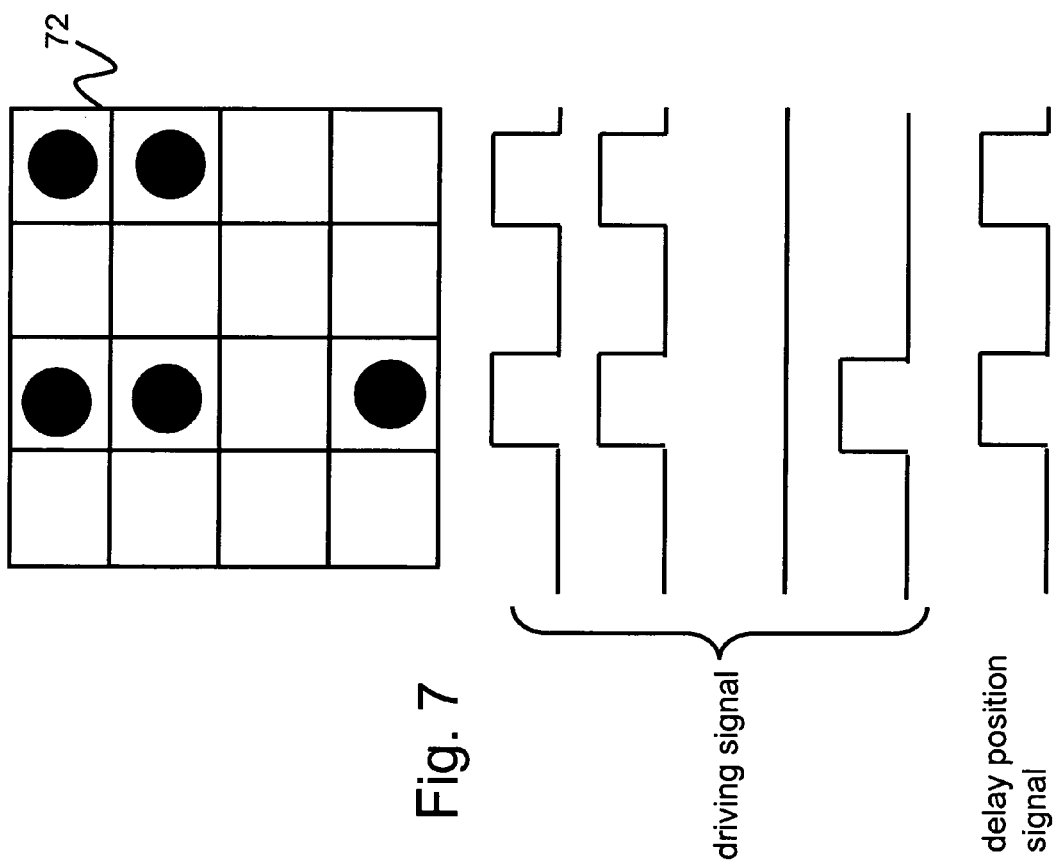
FIG. 7 is a completion view of the second pass of print data.

In the print process of the second print pass, the position-signal generating unit 20 generates a position signal of the second print pass of print data, the head-driving unit 30 generates a corresponding driving signal at a position 72 of corresponding pixels in the send print pass of the print data by responding to the position signal and cooperating with the second print pass of print data, such that the ink-jet head 40 prints the data, as shown in FIG. 7.

A delay interval between the position signal corresponding to the first print pass of print data and the position signal corresponding to the second print pass of the print data is 1/600 inch.

Figure 8:
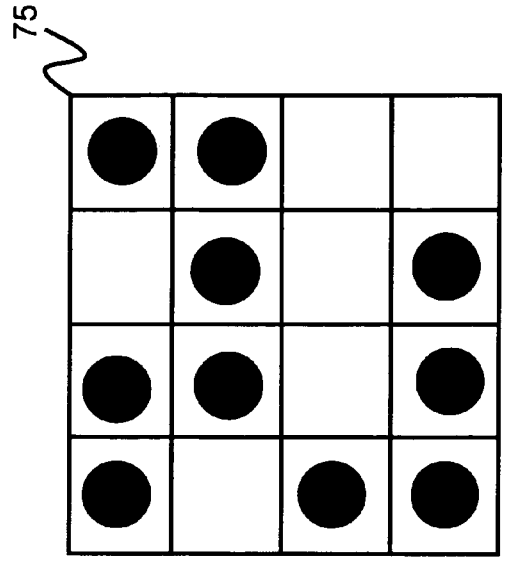
FIG. 8 is a completion view of a print result.

Finally, after the first print pass of print data and the second print pass of print data are printed, the completion view of the print result is as shown in FIG. 8.

As known from the above description, the multi-pass printing apparatus provided by the present invention divides the print data into multiple passes of print data by using complementary masks, to prevent the print quality from being influenced by the limitation of the driving frequency of the ink-jet head and the ink droplet size.

Furthermore, each print pass of print data has a position signal with a different delay time, and each print pass of print data can be interlaced. Therefore, when the ink-jet head 40 is driven by the motor to print in a high resolution, the motor only delays the print positions of the passes, to achieve a complete print output. Therefore, the resolution of the motor displacement can be lower than the print resolution.

Furthermore, the present invention further provides a multi-pass print method according to the multi-pass printing apparatus described above, as shown in FIG. 9. The method comprises the following steps. The print data is divided into M passes of print data to be printed through the pass-dividing unit 10, wherein each pass of the print data to be printed includes multiple corresponding pixels (Step 100).

The corresponding pixels of each pass of print data to be printed can be obtained by a complementary mask method, or can be obtained by classifying the pixels with a same remainder got by dividing the horizontal position of the print data with the number of the M passes to be printed into a same group.

In another word, the pixels with remainders 0 got by dividing the horizontal position of the print data by the number of the M passes to be printed are classified into a same group, the ones with remainders 1 are classified into a same group, and the ones with remainders 2 are classified into a same group. The other can be deduced in such a way, until the ones with remainders (M−1) got by dividing the horizontal position of the print data with the number of the M passes to be printed are classified into a same group.

Then, the position-signal generating unit 20 is provided to generate multiple position signals corresponding to each pass to be printed, wherein each position signal includes positions of multiple corresponding pixels in each pass of print data to be printed.

The position signal corresponding to each print pass of print data is derived by delay a time based on an original position signal, thereby scheduling the M passes to be printed (Step 110).

That is, after two print passes of print data are generated by the pass-dividing unit 10, the delay times corresponding to each pass of the print data to be printed are set by the signal generating unit 20 according to the resolution of the print data and the divided passes of print data to be printed, such that position signals with different delay times are obtained, or delay times can be set in other manners.

The setting of the delay time is illustrated with the resolution of the print data and the divided passes to be printed. When the resolution of the print data is N DPI, and the print data is divided into M passes of print data by the pass-dividing unit 10, the position-signal generating unit 20 sends a position signal with a resolution of N/M DPI, corresponding to each pass of the print data to be printed, and each position signal includes positions of the corresponding pixels of each pass to be printed. The position signal corresponding to each pass of the print data to be printed is derived by delaying a time based on the original position signal. Therefore, there are M delay position signals, corresponding to the M passes to be printed.

The position-signal generating unit 20 is used to provide a position signal of a corresponding pixel in all passes to be printed for the head-driving unit 30, the head-driving unit 30 generates multiple corresponding driving signals by receiving the position signal and cooperating with the positions of multiple pixels in the pass of the print data to be printed at the same time (Step 120). Then, the ink-jet head 40 jets multiple ink droplets according to the multiple driving signals (Step 130).

Then, it judges whether each pass of print data to be printed has been printed or not (Step 140). If each print pass of print data has not been completed, it proceeds to one of the print passes of print data to be printed, i.e., returns (Step 110) until each pass of print data to be printed is completed, and then the print is completed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-pass printing apparatus, comprising:
a pass-dividing unit, for dividing a print data into M passes of print data, wherein each pass of the print data to be printed includes a plurality of corresponding pixels;
a position-signal generating unit, for generating a plurality of position signals corresponding to each pass of the print data to be printed, wherein each position signal has a plurality of positions of each pixel corresponding to the corresponding pass of print data to be printed, wherein each position signal delays a period of time based on an original position signal, thereby scheduling M passes to be printed;
a head-driving unit, generating a corresponding driving signal at each position of each corresponding pixel by responding to each position signal and cooperating with each corresponding pass of print data to be printed; and
an ink-jet head, jetting a plurality of ink droplets for printing, responding to each driving signal generated by the head-driving unit.

2. The multi-pass printing apparatus as claimed in claim 1, wherein each pixel corresponding to each pass to be printed is obtained by a complementary mask method.

3. The multi-pass printing apparatus as claimed in claim 1, wherein each pixel corresponding to each pass to be printed is obtained by classifying the pixels with a same remainder got by dividing a horizontal position of the print data with the number of M passes to be printed into the same group.

4. The multi-pass printing apparatus as claimed in claim 1, wherein the position-signal generating unit generates a position signal with a resolution of N/M DPI, corresponding to each pass of the print data to be printed, wherein N is a resolution of the print data.

5. A multi-pass print method, comprising the following steps:

dividing a print data into M passes of print data to be printed, wherein each pass of the print data to be printed includes a plurality of corresponding pixels;

generating a plurality of position signals corresponding to each pass of the print data to be printed, wherein each position signal has a plurality of positions of each pixel corresponding to the corresponding pass of the print data to be printed, wherein each position signal delays a period of time based on an original position signal, thereby scheduling M passes to be printed;

providing a head-driving unit, for generating a corresponding driving signal at each position of each corresponding pixel by responding to each position signal and cooperating with each corresponding pass of the print data to be printed; and providing an ink-jet head, for jetting a plurality of ink droplets, responding to each driving signal generated by the head-driving unit.

6. The multi-pass print method as claimed in claim 5, wherein in the step of each corresponding pixel of each pass to be printed, each pixel is obtained by a complementary mask method.

7. The multi-pass print method as claimed in claim 5, wherein in the step of each corresponding pixel of each pass to be printed, each pixel is obtained by classifying the pixels with a same remainder got by dividing a horizontal position of the print data with the number of M passes to be printed into a same group.

8. The multi-pass print method as claimed in claim 5, wherein in the step of generating each position signal of each corresponding pixel, a position signal with a resolution of N/M DPI is generated, corresponding to the pass of the print data to be printed, wherein N is a resolution of the print data.

* * * * *